United States Patent
Rossberg et al.

(10) Patent No.: US 9,863,831 B2
(45) Date of Patent: Jan. 9, 2018

(54) SINTERED BODY COMPRISING A PLURALITY OF MATERIALS AND PRESSURE MEASURING INSTRUMENT COMPRISING SUCH A SINTERED BODY

(71) Applicant: Endress + Hauser GmbH + Co. KG, Maulburg (DE)

(72) Inventors: Andreas Rossberg, Bad Sackingen (DE); Elke Schmidt, Bad Sackingen (DE); Anh Tuan Tham, Berlin (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 40 days.

(21) Appl. No.: 14/779,582

(22) PCT Filed: Feb. 17, 2014

(86) PCT No.: PCT/EP2014/052987
§ 371 (c)(1),
(2) Date: Sep. 24, 2015

(87) PCT Pub. No.: WO2014/154394
PCT Pub. Date: Oct. 2, 2014

(65) Prior Publication Data
US 2016/0054191 A1    Feb. 25, 2016

(30) Foreign Application Priority Data
Mar. 25, 2013    (DE) .................. 10 2013 103 028

(51) Int. Cl.
*G01L 19/00*    (2006.01)
*G01L 19/04*    (2006.01)
(Continued)

(52) U.S. Cl.
CPC ................ *G01L 19/04* (2013.01); *B32B 1/08* (2013.01); *B32B 5/16* (2013.01); *B32B 7/02* (2013.01);
(Continued)

(58) Field of Classification Search
CPC . G01L 19/00; G01L 19/04; G01L 9/00; G01L 9/0072; C04B 2237/58;
(Continued)

(56) References Cited

U.S. PATENT DOCUMENTS 5,279,909 A    1/1994    Horner et al.
5,561,321 A *  10/1996   Hirano .................. B32B 15/01
                                                           257/700
(Continued)

FOREIGN PATENT DOCUMENTS

DE    19628551 A1    2/1997
DE    10229703 A1    1/2004
(Continued)

OTHER PUBLICATIONS

English Translation of International Preliminary Report on Patentability, WIPO, Geneva, Oct. 8, 2015.
(Continued)

*Primary Examiner* — Nguyen Ha
(74) *Attorney, Agent, or Firm* — Bacon & Thomas, PLLC

(57) ABSTRACT

A sintered body comprises a first region which comprises a first material having a first effective coefficient of thermal expansion $\alpha_1$, a second region which comprises a second material having a second effective coefficient of thermal expansion $\alpha_2$, a transition region between the first region and the second region in which the effective coefficient of thermal expansion changes from the first effective coefficient of thermal expansion to the second effective coefficient of thermal expansion. The transition region has a sequence
(Continued)

of layers with a mixture of at least the first material and the second material, with the mixing ratio of the layers varying in order to achieve a stepwise, in particular monotonic, change in the coefficient of thermal expansion.

19 Claims, 2 Drawing Sheets

(51) Int. Cl.
 *G01L 9/00* (2006.01)
 *B32B 15/04* (2006.01)
 *B32B 1/08* (2006.01)
 *B32B 5/16* (2006.01)
 *B32B 7/02* (2006.01)
 *B32B 18/00* (2006.01)
 *C04B 37/02* (2006.01)

(52) U.S. Cl.
 CPC ............ *B32B 15/043* (2013.01); *B32B 18/00* (2013.01); *C04B 37/021* (2013.01); *G01L 9/0072* (2013.01); *B32B 2264/105* (2013.01); *B32B 2264/107* (2013.01); *B32B 2307/734* (2013.01); *C04B 2235/6026* (2013.01); *C04B 2235/665* (2013.01); *C04B 2235/9607* (2013.01); *C04B 2237/064* (2013.01); *C04B 2237/123* (2013.01); *C04B 2237/124* (2013.01); *C04B 2237/343* (2013.01); *C04B 2237/406* (2013.01); *C04B 2237/407* (2013.01); *C04B 2237/58* (2013.01)

(58) Field of Classification Search
 CPC ........ C04B 2237/064; C04B 2237/124; C04B 2237/343; C04B 2237/407; C04B 2237/123; C04B 2237/406; B32B 1/08; B32B 5/16; B32B 7/02; B32B 15/043; B32B 18/00; B32B 2264/105; B32B 2264/107; B32B 2264/734; B32B 15/04
 See application file for complete search history.

(56) References Cited

U.S. PATENT DOCUMENTS

| | | | |
|---|---|---|---|
| 6,037,066 A * | 3/2000 | Kuwabara | B22F 7/008 257/675 |
| 6,363,790 B1 * | 4/2002 | Flogel | G01L 9/0075 361/283.4 |
| 7,150,197 B2 | 12/2006 | Hegner et al. | |
| 7,249,515 B2 * | 7/2007 | Hegner | G01L 9/0075 361/283.1 |
| 8,746,073 B2 | 6/2014 | Getman et al. | |
| 2009/0011249 A1 * | 1/2009 | Sakamoto | H05K 3/4688 428/428 |
| 2010/0062267 A1 * | 3/2010 | Karmazin | B32B 18/00 428/446 |
| 2010/0151217 A1 * | 6/2010 | Kanada | H01L 23/15 428/217 |
| 2011/0065973 A1 | 3/2011 | Fernie et al. | |
| 2011/0236713 A1 | 9/2011 | Radwan et al. | |
| 2013/0216848 A1 * | 8/2013 | Kalich | B22F 1/02 428/554 |
| 2014/0079946 A1 * | 3/2014 | Jindo | H01J 37/3222 428/336 |
| 2016/0002110 A1 * | 1/2016 | Izumi | B32B 15/04 428/332 |

FOREIGN PATENT DOCUMENTS

| | | |
|---|---|---|
| DE | 10243079 A1 | 3/2004 |
| DE | 19628551 B4 | 4/2004 |
| DE | 102009027899 A1 | 1/2011 |
| EP | 0995979 B1 | 4/2000 |
| EP | 2380686 A2 | 10/2011 |
| JP | WO 2011122407 A1 * | 10/2011 ........... H01L 23/142 |

OTHER PUBLICATIONS

International Search Report,, EPO, The Netherlands, May 27, 2014.
German Search Report, German PTO, Munich, dated Dec. 13, 2013.
"Fabrication and thermal properties of a YSZ—NiCr joint with an interlayer of YSZ—NiCr functionally graded material," J.Q. Li et al., Journal of the European Ceramic Society, Elsevier Science Publishers, Barking, Essex, Great Britain, vol. 23, No. 11, Oct. 2003, pp. 1847-1853.

* cited by examiner

SINTERED BODY COMPRISING A PLURALITY OF MATERIALS AND PRESSURE MEASURING INSTRUMENT COMPRISING SUCH A SINTERED BODY

TECHNICAL FIELD

This invention relates to a sintered body comprising a plurality of materials, in particular a metallic-ceramic sintered body, and a pressure measuring instrument comprising such a sintered body.

BACKGROUND DISCUSSION

In metrology, especially in process measuring technology, there are configurations in which a metallic body is mechanically coupled with a ceramic body. The mechanical coupling may in particular be an intermediate seal and/or a joint which is a welded, soldered or glued connection.

Due to the different coefficients of thermal expansion of, for instance about 16.5 ppm/K for the common stainless steels, 18.5 ppm/K for brass and, for example, 5 ppm/K to 8 ppm/K for ceramic materials, thermo-mechanical tension occurs in the area of influence of this mechanical coupling which may lead to drift or hysteresis of the measuring signal of a sensor connected with the body or the destruction of the mechanical coupling.

Elastic elements, such as elastomer gaskets or radially flexible metallic spring bodies positioned between metallic and ceramic bodies do have a certain decoupling effect, but on the other hand lead to other disadvantages.

Elastomers have a large coefficient of thermal expansion, which may lead to changeable axial tension and radial couplings in the clamping chain that depend on the algebraic sign of a temperature leap, as for example described in German patent DE 10 2009 027 899 A1.

A pressure sensor with a support ring having radially flexible spring struts has been described in German patent DE 196 28 551 B4. The disadvantage of this construction, however, is that the radial spring force coupled in a friction fit introduces bending torques into the measuring cell, which may be undefined due to relaxations leaps that occur.

Furthermore, from the European patent EP 0 995 979 B1 we know ceramic decoupling bodies between a ceramic pressure measuring cell and a metallic housing between metallic and ceramic bodies that may serve to decrease tensions, although in such cases hysteresis may occur depending on the possibility of relative movements to compensate thermal expansion differences.

SUMMARY OF THE INVENTION

The object of this invention is therefore to remedy the above-noted defects.

This invention is based on the consideration of reducing the differences in thermal expansion steadily and/or in small steps. One approach is provided by bodies that have been prepared by sintering metallic-ceramic layers of powder. Such sintered bodies are, for instance, known from the IMW industry notification no. 29 (2004) by Trenke titled "Selektives Lasersintern von metallisch/keramischen Schichtstrukturen" ["Selective laser sintering of metallic/ceramic layered structures"]. According to the above-mentioned, it is basically possible to solidify powder in layers by laser sintering, with the powders containing mixtures of metallic and ceramic particles. In this way, it is possible to prepare solid bodies. A layered variation of the composition the authors now intend to provide a sintered body according to the invention according to claim 1 to complete the purpose of the invention.

The invention also comprises the pressure measuring instrument.

The sintered body according to the invention comprises: a first region which comprises a first material having a first effective coefficient of thermal expansion $\alpha_1$, a second region which comprises a second material having a second effective coefficient of thermal expansion $\alpha_2$, a transition region between the first region and the second region in which the effective coefficient of thermal expansion changes from the first effective coefficient of thermal expansion to the second effective coefficient of thermal expansion, where the transition region has a sequence of layers with a mixture of at least the first material and the second material, with the mixing ratio of the layers varying in order to achieve a stepwise, in particular monotonic, change in the coefficient of thermal expansion.

In one further development of the invention, the layers of the transition region are substantially parallel to each other, with the layers especially being substantially planar.

In one further development of the invention, the transition region has a maximum extension d vertically to one direction of the layer sequence, with the transition region having a height h in the direction of the layer sequence, whereby the following applies:

$$\frac{d}{h} \cdot |\Delta \alpha| < \xi,$$

wherein $\Delta \alpha$ is the difference between the first effective coefficient of thermal extension and the second coefficient of thermal expansion, and wherein $\xi$ is a constant with the dimension 1/K, for which the following applies: $\xi < 0.1\%/K$, especially <500 ppm/K, preferably <250 ppm/K, further preferred <125 ppm/K and particularly preferred <60 ppm/K.

In one further development of the invention, the following applies:

$$\xi = \frac{C}{\Delta T}$$

wherein $\Delta T = (T_{max} - T_{min})$ is the size of a specified temperature range for the sintered body, and wherein C is a dimensionless deformation parameter, for which the following applies: C<4%, especially C<2% and preferably C<1%.

In one further development of the invention, the transition region has a maximum extension d vertically to one direction of the layer sequence, for example the outer diameter of a cylindrical body, with at least one layer having an average layer thickness s, whereby the following applies:

$$\frac{d}{s} \cdot |\Delta \alpha_s| < \xi_s,$$

wherein $\Delta \alpha_s$ is the difference between the effective coefficient of thermal expansion of the layers adjacent to this layer, and wherein $\xi_s$ is a constant with the dimension 1/K for which the following applies: $\xi_s < 0.1\%/K$, especially <500 ppm/K, preferably <250 ppm/K, further preferred <125 ppm/K and particularly preferred <60 ppm/K.

In one further development of the invention, the following applies:

$$\xi_s = \frac{C_s}{\Delta T}$$

wherein $\Delta T = (T_{max} - T_{min})$ is the size of a specified temperature range for the sintered body, and with $C_S$ being a dimensionless deformation parameter, for which the following applies: $C_S < 4\%$, especially $< 2\%$ and preferably $< 1\%$.

In one further development of the invention, the first material is a ceramic material with a coefficient of thermal expansion of no more than 10 ppm/K, especially not more than 8 ppm/K, with the second material being a metallic material with a coefficient of thermal expansion of no less than 12 ppm/K, especially not less than 14 ppm/K and furthermore no less than 15 ppm/K.

In one further development of the invention, the difference between the first coefficient of thermal expansion and the second coefficient of thermal expansion is at a value of no less than 5 ppm/K.

In one further development of the invention, the layers in the transition region each have a layer height h of no less than 10 µm, especially no less than 20 µm and preferably no less than 40 µm. In one further development of the invention, the layers in the transition region each have a layer height h of no more than 400 µm, especially no more than 200 µm and preferably no more than 100 µm.

In one further development of the invention, the transition region has N layers with each one having a different effective coefficient of thermal expansion, whose value is between the first coefficient of thermal expansion $\alpha_1$ and the second coefficient of thermal expansion $\alpha_2$, with the number N being no less than $(\Delta\alpha)/(2\ ppm/K)$, especially no less than $(\Delta\alpha)/(1\ ppm/K)$ and preferably no less than $(2\ \Delta\alpha)/(1\ ppm/K)$.

In one further development of the invention, the first region has a first planar surface of the sintered body that faces away from the second region, with the second region having a second planar surface of the sintered body that is facing away from the second region, and wherein the first and the second surface are parallel to the layers of the transition region.

In one further development the sintered body comprises at least sectionally a cylindrical or conical full body or hollow body.

In one further development of the invention, the first and/or the second region has/have a height that is at least half the height of the transition region especially no less than the height of the transition region and preferably no less than double the height of the transition region.

The pressure measuring instrument according to the invention comprises: a sensor body comprising a third material with a third coefficient of thermal expansion, a support body, with the support body comprising a fourth material with a fourth coefficient of thermal expansion, characterized in that a sintered body according to one of the previous claims is arranged between the sensor body and the support body, with the first effective coefficient of thermal expansion of the first region of the sintered body substantially corresponding to the third coefficient of thermal expansion and with the second effective coefficient of thermal expansion of the second region of the sintered body substantially corresponding to the fourth coefficient of thermal expansion, with the first region facing the sensor body and the second region facing the support body.

In one further development, the pressure measuring instrument comprises a metallic casing housing a sensor chamber, with the casing having an opening on the front side that is surrounded by a ring-shaped sealing surface facing the interior, with the sensor body having a front surface facing the opening in the casing, with a gasket ring clamped between the front surface and the sealing surface, with the support body comprising a metallic body that supports itself on one wall of the casing surrounding the interior of the casing, with a rear surface of the sensor body facing the support body, with the sintered body being arranged between the sensor body and the support body.

In one further development of the pressure measuring instrument, the sintered body is firmly bonded to the support body.

In another embodiment of the pressure measuring instrument, the sensor body has a measuring membrane on the front side onto which a pressure to be measured can be applied, with the sensor body having a rear side facing away from the front, with the rear side being linked to the first region of the sintered body in a pressure-retaining and pressure-right connection, and with the second region of the sintered body in a pressure-retaining connection with the support body, with the support body comprising a metallic material, especially steel.

BRIEF DESCRIPTION OF THE DRAWINGS

The invention is in the following explained in further detail on the basis of the embodiments shown in the illustrations.

DETAILED DISCUSSION IN CONJUNCTION WITH THE DRAWINGS

Figure 1:
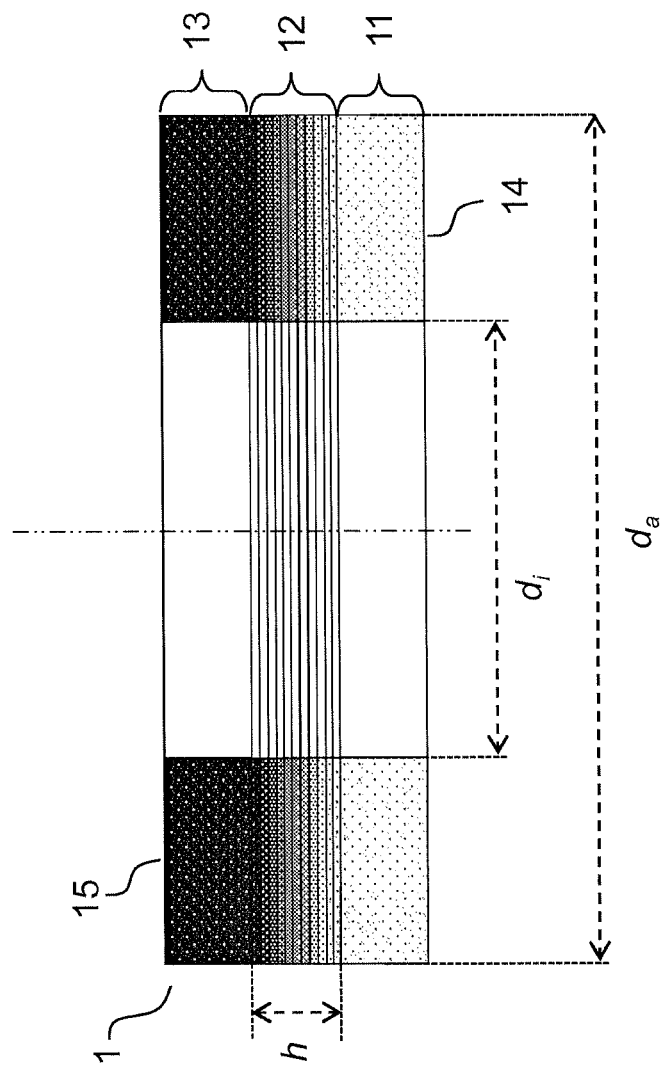
FIG. 1: is a schematic longitudinal view through an example embodiment of a sintered body according to the invention.

The sintered body 1 shown in FIG. 1 has a ring-shaped structure: It shows a first end region 11 made of a ceramic material, e.g., corundum, a transition region 12 and a second end region 13 made of a metallic material, especially steel. The transition region 12 comprises a composition that changes by layers from a first boundary surface facing the first end region 11 and has the axial coordinate z=0, to a second boundary surface facing the second end region 13 and having the axial coordinate z=h, with h being the height of the transition region 12.

The composition of a layer with the average axial coordinate z is approximately $100\% \times (1-z/h)\ W_K$ and $100\% \times (z/h)\ W_M$, with $W_K$ referring to the ceramic component and $W_M$ to the metallic.

The components are especially provided as micro-scaled granulates, preferably with a granular size of no more than 20 µm and further preferably no more than 10 µm.

To prepare a layer, the coordinate-dependent granulate mixture is applied to the layers that are already solidified and solidified by laser sintering, as known from the IMW industry notification no. 29 (2004) by Trenke titled "Selektives Lasersintern von metallisch/keramischen Schichtstrukturen" ["Selective laser sintering of metallic/ceramic layered structures"] or from "Selektives Lasersintern keramischer Mikrobauteile" ["Selective laser sintering of ceramic micro components"], Mikroproduktion 04/08, pg. 36-39.

The sintered body has, for example, a diameter d of 20 mm. At a difference between the coefficient $\alpha$ of thermal expansion of the metallic material and the ceramic material of about 8 ppm/K and a height h =1 mm, the resulting value for the deformation parameter is $d/h \times \Delta\alpha$=160 ppm/K. This value is in the average range for the requirements defined according to the invention.

If the transition region is formed by N layers of an equal layer thickness s=h/N, $d/s \times \Delta\alpha_s$=160 ppm/K applies accordingly. The number N of the layers may, for example, be 10 to 20.

The ceramic component $W_K$ may especially be corundum. The metallic component $W_K$ may especially be steel or brass.

One or both homogeneous end regions of the sintered body may, for example, be prepared with the same laser sintering process, too. On the other hand, an end region prepared in a different process may be produced as a substrate for the layered preparation of the transition region, with the other transition region in that case also being generated by a continuation of the laser sintering process with the composition of the transition region, or is provided as an independently manufactured body that is to be attached flush with a front side of the transition area.

And finally, both end regions may each serve as a substrate for the preparation of a part of the transition region, with the two parts of the transition region being subsequently joined.

If necessary, the sintered body may be kept under pressure at a high temperature one preparation is successfully completed, in order to condense the structure.

Figure 2:
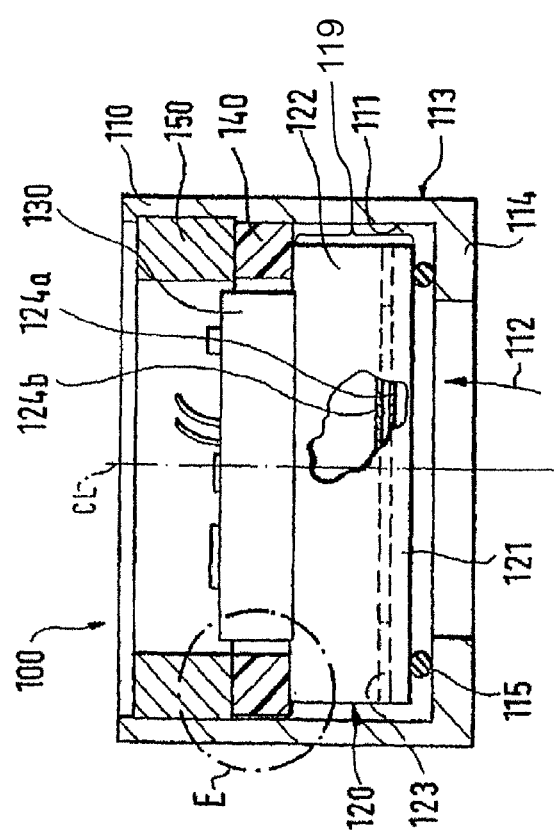
FIG. 2: is a schematic longitudinal view of a first example embodiment of a pressure measuring instrument according to the invention with a sintered body according to the invention.

FIG. 2 shows a pressure measuring instrument 100 comprising a metallic casing 110 with a continuous bore 111 supporting a sensor body 119 in a ceramic pressure measuring cell 120. This is exposed to a process medium not shown here for simplicity's sake, with the process medium affecting a membrane 121 in the pressure measuring cell 120 via an entry opening 112 in the front area 114 of the bore 111. The pressure measuring cell 120 is preferably a pressure measuring cell with a capacitive transformer, as illustrated by the schematically shown electrodes 124a, 124b on the membrane 121 and on a base body 122. The membrane 121 is soldered to the base body 122 at its edge, preferably with an active hard solder 123. The sensor body 119 therefore consists of the base body 122 and the measuring membrane 121.

Instead of the capacitive transformer, other transformers may be used, for example resistive transformers or interferometric transformers.

A measuring signal is available at the pressure measuring cell 120 corresponds to the pressure applied to the membrane 121 by the process medium. It is processed in an electronic component 130 shown here in a schematic illustration only.

The pressure measuring cell 120 is spring-loaded in the casing 110 at a first stop 114 facing the process medium, with the stop being formed by a reduction of the free diameter of the continuous bore 111 of the casing 110. The inside of the casing 110 is sealed with a gasket 115 arranged between the pressure measuring cell 120 and the first stop 114, with the gasket simultaneously ensuring the spring characteristics of the support for the pressure measuring cell 120. The gasket 115 may be, as shown in FIG. 2, an elastic O-ring gasket, although this is not necessarily required for the implementation of the invention, and thus any other spring sealing (or sealing type) may be used.

On the side of the base body 122 of the pressure measuring cell 120 that faces away from the membrane, a ring-shaped sintered body 140 according to the invention is applied that is in turn supported by a metallic support body 150 in the casing 110. The sintered body 140 comprises a ceramic material on a first surface facing the base body 122 whose coefficient of thermal expansion corresponds to the material of the base body, for example corundum or aluminum nitride. The sintered body 140 generally comprises the same material as the base body 122 on the first surface facing the base body.

The sintered body 140 comprises a metallic material on a second surface facing the support body 150 whose coefficient of thermal expansion corresponds to the material of the support body. The sintered body 140 generally comprises the same material as the support body 150 on the surface facing the support body 150.

The metallic support body 150 that acts axially on the sintered body 140 and therefore the pressure measuring cell 120 is attached in a removable connection on and/or in the casing 110. The support body 150 is preferably a ring, as shown in FIG. 2. It may, however, also be a disk, consisting, like the ring, for instance of brass and equipped with an external thread that can be screwed into the corresponding internal thread in the casing 110, or more precisely: in an area of the bore 111 that faces away from the process medium. For simplicity's sake, the two threads are not displayed in FIG. 2.

A marked central line CL shows that the example embodiment of FIG. 2 features a casing 110, bore 111, pressure measuring cell 120, intermediate body 140 and the mounting device 150 are executed in rotational symmetry. If electrical supply lines (not shown here) for the electronic component 130 are used, it is advantageous to execute the sintered body 140 and the support body 150 as a ring shape, as shown in FIG. 2.

Figure 3:
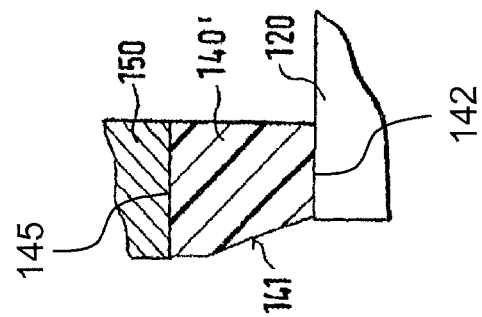
FIG. 3: is a sectional enlarged view of a variation of a sintered body according to the invention as per the detail marked with "E" in FIG. 2.

FIG. 3 schematically shows the details E of FIG. 2 which illustrates in a simplified form and, compared to FIG. 2, with an enlarged scale, a second variation of the sintered body 140' that is arranged between the pressure measuring cell 120 and the support body 150. This second variation of the sintered body 140' differs from the first variation of the sintered body 140 according to FIG. 2 by a chamfer 141 facing the casing 110. It serves to realize a transition from the diameter of the pressure measuring cell 120 to the larger internal diameter of the bore 111 of the casing 110 in a simple manner.

A thin layer of cold extrusion material, e.g. a fluorine plastic material, may be applied between the first surface of the sintered body 140' and a corresponding area of the pressure measuring cell 120. This layer is preferably a first foil of polytetrafluoroethylene (PTFE), which is advantageously applied to the sintered body 140', especially on its first front surface 142.

Similarly, a second foil of cold extrusion material, e.g. a fluorine plastic material, may be applied on the second surface 145 of the intermediate body in order to minimize the friction between the support body 150 and the sintered body 140' in case of thermally caused expansions and ensure that the sintered body 140' and the support body 150 can be moved against each other under all circumstances, and to avoid irreversible changes of position. The second foil as the first foil is preferably made of polytetrafluoroethylene (PTFE).

The invention claimed is:

1. A sintered body, comprising:
a first region which has a first material having a first effective coefficient of thermal expansion $\alpha_1$;
a second region which has a second material having a second effective coefficient of thermal expansion $\alpha_2$; and
a transition region between said first region and said second region in which the effective coefficient of thermal expansion changes from said first effective coefficient of thermal expansion to the second effective coefficient of thermal expansion, wherein:
said transition region has a sequence of layers with a mixture of at least said first material and said second material, with the mixing ratio of the layers varying in order to achieve a stepwise, in particular monotonic, change in the coefficient of thermal expansion;
said transition region has a maximum extension d vertically to one direction of the layer sequence, and said transition region has a height h in the direction of the layer sequence, whereby the following applies:

$$\frac{d}{h} \cdot |\Delta\alpha| < \xi,$$

$\Delta\alpha$ is the difference between the first effective coefficient of thermal extension and the second coefficient of the thermal expansion, and wherein $\xi$ is a constant with the dimension 1/K, for which the following applies: $\xi$ <0.1%/K, especially <500 ppm/K, preferably <250 ppm/K, further preferred <125ppm/K and particularly preferred <60 ppm/K, whereby the following applies:

$$\xi = \frac{C}{\Delta T}$$

$\Delta T = (T_{max} - T_{min})$ is a size of a specified temperature range for the sintered body, and wherein C is a dimensionless deformation parameter, for which the following applies: C <4%, especially C <2% and preferably C <1%.

2. The sintered body according to claim 1, wherein:
said layers substantially run parallel to each other.

3. The sintered body according to claim 2, wherein:
said layers are substantially planar.

4. The sintered body according to claim 1, wherein:
said first material is a ceramic material with a coefficient of thermal expansion of no more than 10 ppm/K, especially not more than 8 ppm/K; and
said second material is a metallic material with a coefficient of thermal expansion of no less than 12 ppm/K, especially not less than 14 ppm/K and furthermore no less than 15 ppm/K.

5. The sintered body according to claim 1, wherein:
the difference between said first coefficient of thermal expansion and said second coefficient of thermal expansion is at a value of no less than 5 ppm/K.

6. The sintered body according to claim 1, wherein:
said layers in the transition region each have a layer height h of no less than 10 μm, especially no less than 20 μm and preferably no less than 40 μm.

7. The sintered body according to claim 1, wherein:
the transition region has N layers with each one having a different coefficient of thermal expansion, whose value is between said first coefficient of thermal expansion $\alpha_1$ and said second coefficient of thermal expansion $\alpha_2$; and
the number N is no less than $(\Delta\alpha)/(2 \text{ ppm/K})$, especially no less than $(\Delta\alpha)/(1 \text{ ppm/K})$ and preferably no less than $(2 \Delta\alpha)/(1 \text{ ppm/K})$.

8. The sintered body according to claim 7, wherein:
the sintered body comprises at least sectionally a cylindrical or conical full body or hollow body.

9. The sintered body according to claim 1, wherein:
said first region has a first planar surface of the sintered body that faces away from said second region;
said second region has a second planar surface of the sintered body that is facing away from said second region; and
said first and said second surface are parallel to the layers of said transition region.

10. A sintered body, comprising:
a first region which has a first material having a first effective coefficient of thermal expansion $\alpha_1$;
a second region which has a second material having a second effective coefficient of thermal expansion $\alpha_2$; and
a transition region between said first region and said second region in which the effective coefficient of thermal expansion changes from said first effective coefficient of thermal expansion to the second effective coefficient of thermal expansion, wherein:
said transition region has a sequence of layers with a mixture of at least said first material and said second material, with the mixing ratio of the layers varying in order to achieve a stepwise, in particular monotonic, change in the coefficient of thermal expansion;
said transition region has a maximum extension d vertically to one direction of the layer sequence, and wherein one layer has an average layer thickness s, whereby the following applies:

$$\frac{d}{s} \cdot |\Delta\alpha_s| < \xi_s,$$

$\Delta\alpha_s$ is the difference between the effective coefficient of thermal expansion of the layers adjacent to this layer, and wherein $\xi_s$ is a constant with the dimension 1/K for which the following applies: $\xi_s$ <0,1%/K, especially <500 ppm/K, preferably <250 ppm/K, further preferred <125 ppm/K and particularly preferred <60 ppm/K, whereby the following applies:

$$\frac{d}{s} \cdot |\Delta\alpha_s| < \xi_s,$$

$\Delta T = (T_{max} - T_{min})$ is the size of a specified temperature range for the sintered body, and with $C_S$ being a dimensionless deformation parameter, for which the following applies: $C_S$ <4%, especially <2% and preferably <1%.

11. A sintered body, comprising:
a first region which has a first material having a first effective coefficient of thermal expansion $\alpha_1$;

a second region which has a second material having a second effective coefficient of thermal expansion $\alpha_2$; and a transition region between said first region and said second region in which the effective coefficient of thermal expansion changes from said first effective coefficient of thermal expansion to the second effective coefficient of thermal expansion, wherein:

said transition region has a sequence of layers with a mixture of at least said first material and said second material, with the mixing ratio of the layers varying in order to achieve a stepwise, in particular monotonic, change in the coefficient of thermal expansion; and said layers in the transition region each have a layer height h of no more than 400 μm, especially no more than 200 μm and preferably no more than 100 μm.

12. A sintered body, comprising:
a first region which has a first material having a first effective coefficient of thermal expansion $\alpha_1$;
a second region which has a second material having a second effective coefficient of thermal expansion $\alpha_2$; and
a transition region between said first region and said second region in which the effective coefficient of thermal expansion changes from said first effective coefficient of thermal expansion to the second effective coefficient of thermal expansion, wherein:
said transition region has a sequence of layers with a mixture of at least said first material and said second material, with the mixing ratio of the layers varying in order to achieve a stepwise, in particular monotonic, change in the coefficient of thermal expansion; and
said first and/or said second region has a height that is at least half the height of said transition region especially no less than the height of said transition region and preferably no less than double the height of said transition region.

13. A pressure measuring instrument, comprising:
a sensor body comprising a third material with a third coefficient of thermal expansion;
a support body comprising a fourth material with a fourth coefficient of thermal expansion;
a sintered body comprising: a first region which has a first material having a first effective coefficient of thermal expansion $\alpha_1$;
a second region which has a second material having a second effective coefficient of thermal expansion $\alpha_2$; and
a transition region between said first region and said second region in which the effective coefficient of thermal expansion changes from said first effective coefficient of thermal expansion to the second effective coefficient of thermal expansion, wherein:
said transition region has a sequence of layers with a mixture of at least said first material and said second material, with the mixing ratio of the layers varying in order to achieve a stepwise, in particular monotonic, change in the coefficient of thermal expansion;
said transition region has a maximum extension d vertically to one direction of the layer sequence; and said transition region has a height h in the direction of the layer sequence, whereby the following applies:

$$\frac{d}{h} \cdot |\Delta \alpha| < \xi.$$

$\Delta\alpha$ is the difference between the first effective coefficient of thermal extension and the second coefficient of thermal expansion, and wherein $\xi$ is a constant with the dimension 1/K, for which the following applies: $\xi<0.1\%/K$, especially <500 ppm/K, preferably <250 ppm/K, further preferred <125ppm/K and particularly preferred <60 ppm/K, whereby the following applies:

$$\xi = \frac{C}{\Delta T}$$

$\Delta T=(T_{max}-T_{min})$ is the size of a specified temperature range for the sintered body, and wherein C is a dimensionless deformation parameter, for which the following applies: C<4%, especially C<2% and preferably C<1%; and said sintered body is arranged between said sensor body and said support body, with said first effective coefficient of thermal expansion of said first region of said sintered body substantially corresponding to said third coefficient of thermal expansion and with said second effective coefficient of thermal expansion of said second region of said sintered body substantially corresponding to said fourth coefficient of thermal expansion, with said first region facing said sensor body and said second region facing said support body.

14. The pressure measuring instrument according to claim 13, further comprising:
a metallic casing housing a sensor chamber, with said casing having an opening on the front side that is surrounded by a ring-shaped sealing surface facing the interior, wherein said sensor body has a front surface facing the opening in said casing; and
a gasket ring clamped between said front surface and said sealing surface, wherein:
said support body comprises a metallic body that supports itself on one wall of said casing surrounding the interior of said casing;
a rear surface of said sensor body faces said support body; and
the sintered body is arranged between said sensor body and said support body.

15. The pressure measuring instrument according to claim 13, wherein:
said sintered body is firmly bonded to said support body.

16. The pressure measuring instrument according to claim 13, wherein:
said sensor body having a measuring membrane on the front side onto which a pressure to be measured can be applied;
said sensor body has a rear side facing away from the front, with the rear side being linked to said first region of said sintered body in a pressure-retaining and pressure-tight connection;
said second region of said sintered body has pressure-retaining connection with said support body; and
said support body comprises a metallic material, especially steel.

17. A pressure measuring instrument, comprising:
a sensor body comprising a third material with a third coefficient of thermal expansion;
a support body comprising a fourth material with a fourth coefficient of thermal expansion; and
a sintered body comprising: a first region which has a first material having a first effective coefficient of thermal expansion $\alpha_1$; a second region which has a second material having a second effective coefficient of thermal expansion $\alpha_2$; and a transition region between said first region and said second region in which the effective coefficient of thermal expansion changes from said first effective coefficient of thermal expansion to the second effective coefficient of thermal expansion, wherein: said transition region has a sequence of layers with a mixture of at least said first material and said second material, with the mixing ratio of the layers varying in order to achieve a stepwise, in particular monotonic, change in the coefficient of thermal expansion, wherein:

said transition region has a maximum extension d vertically to one direction of the layer sequence, and wherein one layer has an average layer thickness s, whereby the following applies:

$$\frac{d}{s} \cdot |\Delta\alpha_s| < \xi_s.$$

$\Delta\alpha_s$ is the difference between the effective coefficient of thermal expansion of the layers adjacent to this layer, and wherein $\xi_s$ is a constant with the dimension 1/K for which the following applies: $\xi_s < 0.1\%/K$, especially <500 ppm/K, preferably <250 ppm/K, further preferred <125 ppm/K and particularly preferred <60 ppm/K, whereby the following applies:

$$\xi_s = \frac{C_s}{\Delta T}$$

$\Delta T = (T_{max} - T_{min})$ is the size of a specified temperature range for the sintered body, and with $C_S$ being a dimensionless deformation parameter, for which the following applies: $C_S < 4\%$, especially <2% and preferably <1%; and said sintered body is arranged between said sensor body and said support body, with said first effective coefficient of thermal expansion of said first region of said sintered body substantially corresponding to said third coefficient of thermal expansion and with said second effective coefficient of thermal expansion of said second region of said sintered body substantially corresponding to said fourth coefficient of thermal expansion, with said first region facing said sensor body and said second region facing said support body.

18. A pressure measuring instrument, comprising:
a sensor body comprising a third material with a third coefficient of thermal expansion;
a support body comprising a fourth material with a fourth coefficient of thermal expansion;
a sintered body comprising: a first region which has a first material having a first effective coefficient of thermal expansion $\alpha_1$;
a second region which has a second material having a second effective coefficient of thermal expansion $\alpha_2$; and
a transition region between said first region and said second region in which the effective coefficient of thermal expansion changes from said first effective coefficient of thermal expansion to the second effective coefficient of thermal expansion, wherein: said transition region has a sequence of layers with a mixture of at least said first material and said second material, with the mixing ratio of the layers varying in order to achieve a stepwise, in particular monotonic, change in the coefficient of thermal expansion, wherein:
said layers in the transition region each have a layer height h of no more than 400 μm, especially no more than 200 μm and preferably no more than 100 μm; and
said sintered body is arranged between said sensor body and said support body, with said first effective coefficient of thermal expansion of said first region of said sintered body substantially corresponding to said third coefficient of thermal expansion and with said second effective coefficient of thermal expansion of said second region of said sintered body substantially corresponding to said fourth coefficient of thermal expansion, with said first region facing said sensor body and said second region facing said support body.

19. A pressure measuring instrument, comprising:
a sensor body comprising a third material with a third coefficient of thermal expansion; and
a support body comprising a fourth material with a fourth coefficient of thermal expansion;
a sintered body comprising: a first region which has a first material having a first effective coefficient of thermal expansion $\alpha_1$;
a second region which has a second material having a second effective coefficient of thermal expansion $\alpha_2$; and
a transition region between said first region and said second region in which the effective coefficient of thermal expansion changes from said first effective coefficient of thermal expansion to the second effective coefficient of thermal expansion, wherein:
said transition region has a sequence of layers with a mixture of at least said first material and said second material, with the mixing ratio of the layers varying in order to achieve a stepwise, in particular monotonic, change in the coefficient of thermal expansion;
said first and/or second region has a height that is at least half the height of said transition region especially no less than the height of said transition region and preferably no less than double the height of said transition region; and
said sintered body is arranged between said sensor body and said support body, with said first effective coefficient of thermal expansion of said first region of said sintered body substantially corresponding to said third coefficient of thermal expansion and with said second effective coefficient of thermal expansion of said second region of said sintered body substantially corresponding to said fourth coefficient of thermal expansion, with said first region facing said sensor body and said second region facing said support body.

* * * * *